United States Patent [19]
Leonard

[11] 3,837,687
[45] Sept. 24, 1974

[54] COUPLING FOR TUBING

[76] Inventor: George Hamlin Leonard, 327 Hollow Tree Ridge Rd., Darien, Conn. 06820

[22] Filed: Dec. 29, 1972

[21] Appl. No.: 319,520

[52] U.S. Cl............. 285/111, 277/9, 277/125, 279/1 SG, 279/96, 285/315, 285/320, 285/340, 403/288
[51] Int. Cl............................................. F16l 17/02
[58] Field of Search ...... 285/340, DIG. 3, 111, 105, 285/81, 308, 314, 313, 174, 346, 196, 162, 110, DIG. 11, 315, 320, 39, 321; 267/1.5; 277/125, 9; 279/1 SG, 96, 102

[56] References Cited
UNITED STATES PATENTS

| | | | |
|---|---|---|---|
| 2,090,550 | 8/1937 | Pilblad | 285/DIG. 3 |
| 2,594,164 | 4/1952 | Hedberg | 267/1.5 |
| 2,670,223 | 2/1954 | Ream | 285/340 |
| 2,693,378 | 11/1954 | Beyer | 285/111 X |
| 2,925,289 | 2/1960 | Brown, Jr. et al. | 285/DIG. 3 |
| 2,944,840 | 7/1960 | Wiltse | 285/321 X |
| 2,995,388 | 8/1961 | Morello, Jr. et al. | 285/340 |
| 3,027,179 | 3/1962 | Wiltse | 285/321 |
| R19,910 | 3/1936 | Parker | 285/314 X |

FOREIGN PATENTS OR APPLICATIONS 299,200 10/1928 Great Britain................ 285/346

Primary Examiner—Jordan Franklin
Assistant Examiner—Moshe I. Cohen

[57] ABSTRACT

A novel fitting includes an enclosure containing a sealing ring and at least one grip-ring both of which are self-energizing into cooperation with an inserted tube having an ordinary cylindrical exterior. A device in the coupling enlarges the inner diameters of both rings to admit a tube and to release an inserted tube, without danger of the tube scarring the seal-forming surface of the sealing ring, or of the grip-ring scoring the tube.

21 Claims, 12 Drawing Figures

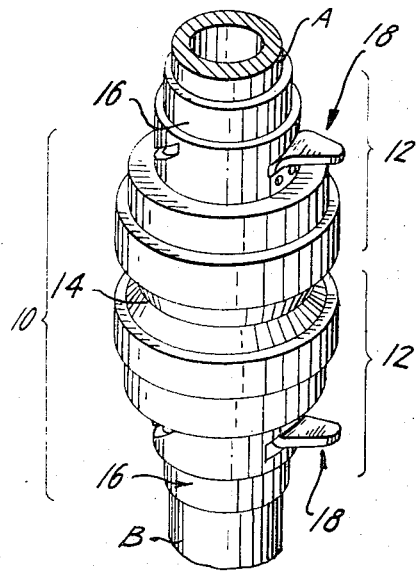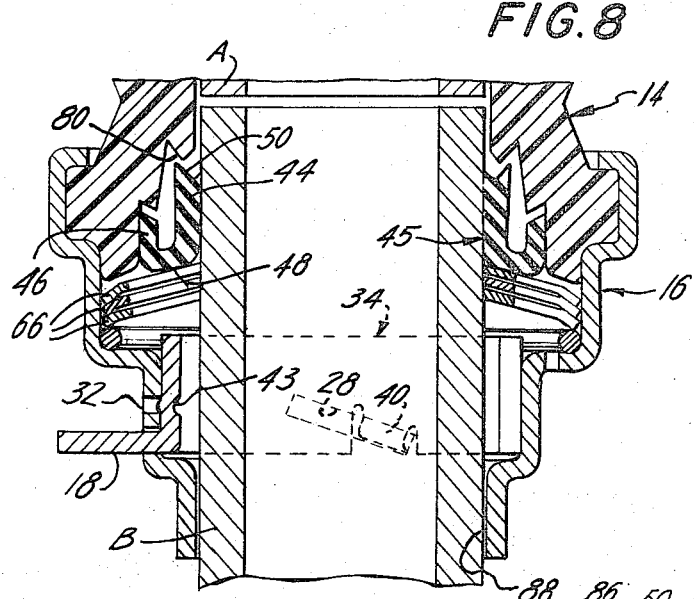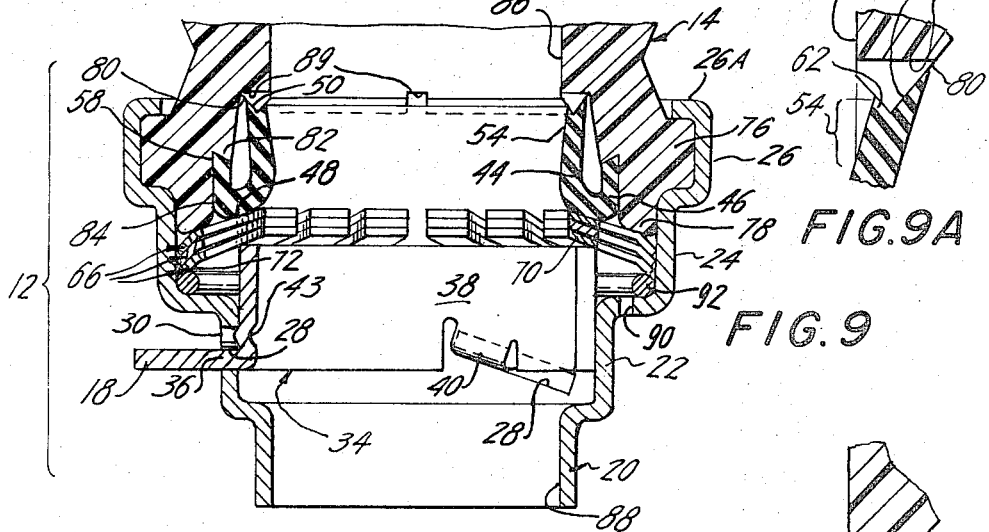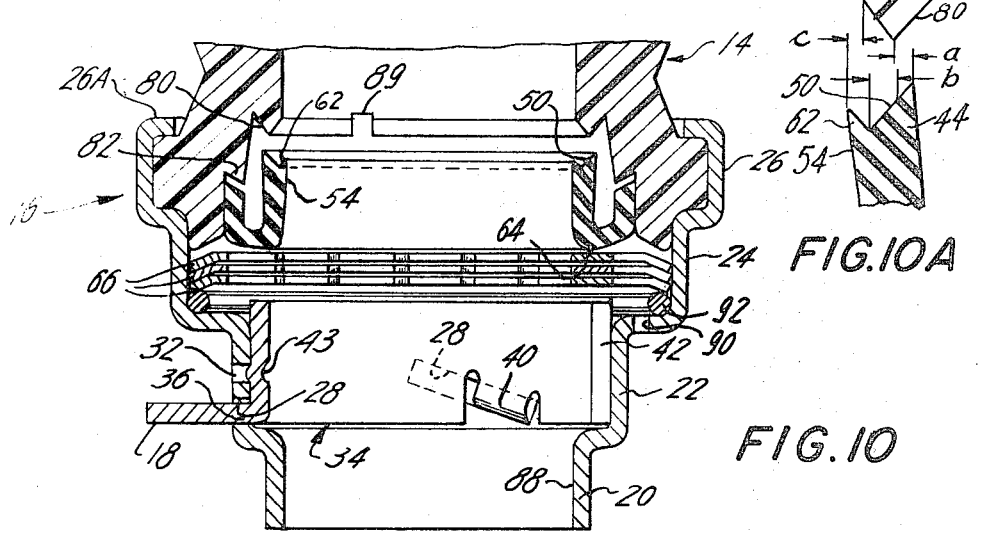

COUPLING FOR TUBING

This invention relates to a device for coupling a tube to another part of a fluid-conducting system.

BACKGROUND OF THE INVENTION

One common technique of uniting a liquid-conducting system involves sweating or soldering copper fittings to copper tubing. The surfaces to be soldered usually must be cleaned and assembled, and they they must be heated to soldering temperature as solder is applied. In a water-supply system, for example, the water must be drained in case it becomes necessary to separate the parts for making a repair, and once again the parts to be separated must be heated to melt the solder. These operations require a substantial amount of costly labor.

Another type of fitting involves a sealing ring or packing and mating threads on the tubing and on the fiting, or mating threads on parts of the coupling. In using such fittings, a sealing ring is forced over the tube to which the fitting is to form a joint, and then the threaded parts are tightened to squeeze the sealing ring into its effective seal-forming configuration.

A still further category of fittings is used in pneumatic pressure systems. A quick-release coupling for that purpose involves main parts which are first joined to the parts of the system to be connected, after which the main parts of the coupling can be quickly connected and separated. Such a coupling is in reality a combined shut-off valve and coupling. Notably each main part of such a coupling must be joined somehow to a tube of the system in a secure fluid-tight manner.

There are vast numbers of additional types of fittings for tubing in a fluid-conducting system, that would defy succinct listing here.

OUTLINE OF THE INVENTION

An object of this invention resides in providing a novel fitting which can be assembled into its desired position on an essentially unprepared tube and which can be manipulated instantly to form a fluid-tight seal between the fitting and the tube, and which can also be manipulated instantly to release such seal. A related object resides in providing such a fitting which does not require threaded parts or thread-tightening and loosening labor.

A further object of the invention resides in the provision of such a fitting that includes a coordinately operable gripper for mechanically retaining the assembled fitting and tube, despite internal pressure tending to blow the tube out of the fitting and to resist other forces tending to pull the tube out of the fitting. More specifically, an object of the invention resides in providing novel fittings as outlined above, which are self-energizing into their sealing configuration and which are releasable by a self-contained release device. As a further feature, the release device functions without any need for becoming interposed between the sealing ring and the tube.

A presently preferred form of fitting, as an illustrative embodiment of the invention, is shown in the accompanying drawings and described in detail below, for achieving the foregoing and other objects of the invention, and incorporating the above and other novel features. The illustrative fitting includes an enclosure comprising a body member and a ferrule united to each other. Within the enclosure there are a sealing-ring, plural grip-rings, and a contained release member. The sealing ring and the grip-ring are self-energizing so that they cooperate with an inserted tube to form a seal thereto and to provide mechanical retention for the inserted tube. The release device enlarges the inside diameters of these rings for releasing a tube to be removed and for admitting a tube, without danger of marring the seal-forming surface of the sealing ring or of the tube.

In the illustrative fitting, a sealing ring that is roughly U-shaped in cross-section has an inner wall to seal to an inserted tube, an outer wall to seal to a sealing surface of the fitting enclosure, and a connecting wall, arranged so that the space between the inner and outer walls is exposed to internal pressure of the system. The inner surface of the inner wall tapers inward from the connecting wall to its free edge, the minimum diameter being less than that of the inserted tube. A grip-ring, and ordinarily multiple grip-rings are included, is disposed adjacent to the connecting wall of the sealing ring. The grip-ring has castellated inner and outer edges forming multiple elements whose outer extremities are firmly confined and whose inner extremities form a circle whose diameter can be enlarged a bit greater than the outside diameter of a tube to be inserted, by causing the gripping elements to slant prominently out of a plane crossing the axis of the grip-ring. The resilience of the grip-ring provides self-bias urging the gripping elements toward that plane, thus reducing the inner diameter of the grip-ring so that the gripping elements can seize an inserted tube. The elements then slope at a reduced angle relative to the transverse plane of their outer diameter. The inside diameter of the grip-ring decreases, and an inserted tube is gripped. The slight slope of the gripping elements is such that their inner ends are directed inward and, with a small component along the inserted tube, away from the opening of the coupling that admits the tube.

A release device is contained in the enclosure of the illustrative fitting. It can be operated axially along the fitting for driving the inner extremities of the tube gripping elements away from the tube-admitting opening of the fitting. This action increases the slope of the tube-gripping elements, enlarging the inside diameter of the grip-ring that is directly engaged by the release member and enlarging the inside diameters of other grip-rings stacked on the directly engaged ring.

Operation of the grip-rings to their released (greater-slope) configuration causes pressure to be applied by the inner ends of the grip-ring nearest the sealing ring to the place where connecting wall and the inner wall of the sealing ring join one another. The inner wall is shifted along the axis of the fitting, while the outer wall of the sealing ring is arrested. This shift of the inner sealing-ring wall causes enlargement of the seal-forming surface due to various contributing actions that will be understood from the detailed description that follows. A tube of slightly smaller diameter than the enlarged inner diameters of the seal-forming surface and the grip-ring can be inserted into the fitting, without rubbing either. The grip-ring does not score a tube during insertion, and the tube does not scratch the seal-forming surface of the sealing ring.

Operation of the release device into its "lock" position frees the seal-forming surface and the grip-ring to grip the inserted tube, both these rings being self-energized in this action. Internal fluid pressure augments the sealing pressure of the inner sealing-ring wall against an inserted tube, and the fluid pressure also causes the sealing ring to press the adjacent grip ring toward its reduced-slope configuration for more securely gripping the inserted tube.

It may become necessary to release the fitting from the tube, as for repairing the system. To do this, the release member is operated to drive the inner portions of the grip-rings against the sealing ring so as to increase the inner diameter of the grip-rings and the seal-forming surface. Shifting the inner sealing-ring wall along the tube tends to break an adhesion that might develop. Enlargement of the inner diameters of the seal-forming surface and the grip-rings allows the tube to be withdrawn from the fitting without harming the seal-forming surface and without the grip-ring causing the tube to be scored.

The illustrative fitting includes the enclosure, the sealing ring, and plural grip-rings in the enclosure, as well as the release member. In broad concept, the release member could be separate, as part of a fitting-releasing tool, but as a specific and important feature of the invention, it is contained in the enclosure, as part of the fitting.

Two such assemblies can be integrated by a common body to form a single fitting, which then becomes a union or an elbow. Three such assemblies incorporated into a single fitting can form a T. A fitting having only one assembly as outlined above can be used to join a tube to a pressure vessel. Notably in each case, the tubes need no special shaping or other preparation for use with such fittings. It is only necessary for the tube to be cut to length and, as a precaution, any sharp projecting burrs at the tube end should be removed.

The fitting described can be used with metal tubes as of copper, with relatively soft tubes as of plastic, and with relatively hard tubes such as glass. The operation of the fitting between its released condition for receiving a tube and its locked condition on a tube, or the reverse operation, is rapid. No special tools are necessary where the release device is incorporated in the fitting.

The nature of the invention including the foregoing and other novel features of the invention and their advantages will be more fully appreciated from the following detailed description of the presently preferred illustrative embodiment which is shown in the accompanying drawings. In the drawings:

FIG. 1 is a perspective view of a union including upper and lower couplings for making seals to respective upper and lower tubes inserted therein.

FIG. 2 is a perspective view of a ferrule;

FIG. 3 is a perspective view of a release member;

FIG. 4 is a greatly enlarged cross-section of a sealing ring along its axis, in its unstressed condition prior to assembly as part of a coupling;

FIG. 5 is a perspective of a grip-ring;

FIG. 6 is a greatly enlarged portion of the grip-ring of FIG. 5; and

FIG. 7 is a fragmentary view of peripheral portions of two grip-rings, one resting on the other, each being of the form in FIGS. 5 and 6 and as viewed from the plane 7—7 in FIG. 6;

FIG. 8 is a greatly enlarged longitudinal cross-section of the lower coupling forming part of the union of FIG. 1, as an illustrative embodiment of the invention, the upper releasable coupling of the union being broken away, and including edn portions of two inserted tubes, the coupling being shown in its "locked" or sealing condition;

FIG. 9 is a view corresponding to FIG. 8, showing one coupling of FIG. 1 with the parts in their released condition, either in readiness to receive a tube or after removal of a released tube;

FIG. 10 is a cross-section corresponding to FIG. 8 with the parts in the "locked" configuration of the coupling, with no inserted tube; and FIGS. 9A and 10A are greatly enlarged details of FIGS. 9 and 10, respectively.

Figure 2:
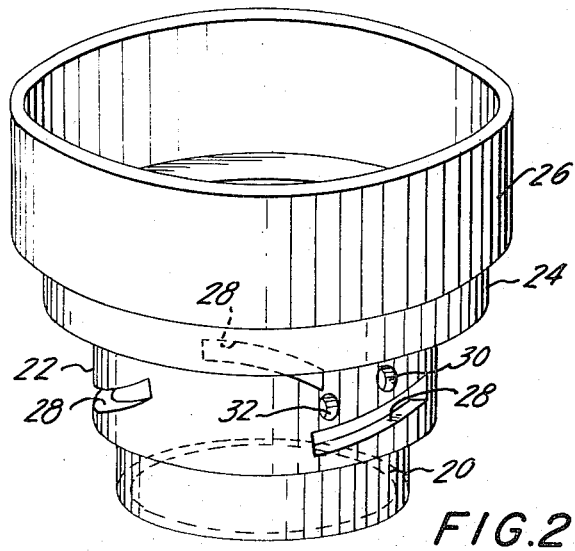
FIGS. 2 through 7 are views of components of one of the two couplings in the union of FIG. 1, drawn to much larger scale than FIG. 1, and, more particularly.
Figure 3:
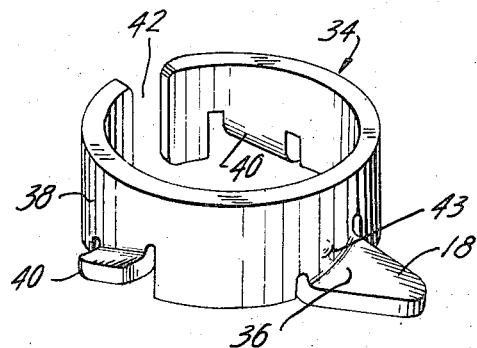

In FIG. 1, a union 10 is shown for making a pressure-tight connection between tubes A and B. The union includes a common body 14, forming part of each of the two couplings 12 that make releasable seals to tubes A and B.

Each coupling includes an outer enclosing member or ferrule 16 assembled to body 14, and the projecting handle 18 of a release member.

The parts of a coupling shown in FIGS. 2–7 will be described before considering the assembled coupling shown in FIGS. 8–10. No separate view of body 14 is included in the drawings because the body 14 is shown adequately in the assembly drawings.

Ferrule 16 of FIG. 1 is not identical to the ferrule of FIG. 2, inasmuch as the ferrule as shown in FIG. 2 is in its condition prior to assembly to body 14. The upper end of the ferrule as viewed in FIG. 2 will be spun or crimped over the body in completing the assembly of each coupling.

Ferrule 16 includes four sections 20, 22, 24 and 26 of successively greater diameter. Three cam slots 28 are formed in section 22 as short helical segments, at 120° separation from each other. Two detent apertures 30 and 32 are provided close to one of the cam slots 28.

Release member 34 having handle 18 (mentioned above) has cam portion 36, which has the same slant as helical slots 28 of ferrule 16. This cam slants relative to a plane perpendicular to the axis of cylindrical body 38. Two more cam portions 40 extend from body 38 at about 120° separation from each other. In the course of assembling the whole releasable coupling, member 34 is inserted into ferrule 16, and handle 18 of release member 34 is fitted through that slot 28 which is adjacent detent apertures 30 and 32. There is a break 42 in member 34 remote from operating handle 18, so that body 38 is an incomplete cylinder. When member 34 is being assembled into ferrule 16, break 42 allows cylindrical body 38 to be compressed sufficiently for cams 40 to enter section 22 of the ferrule, after which they snap outward into corresponding cam slots 28. The outer diameter of body 38 is normally a bit larger than the inside diameter of ferrule section 22, and body 38 is firmly resilient, so that pimple or detent 43 is pressed firmly into one or the other of the two detent apertures 30 and 32.

Figure 4:
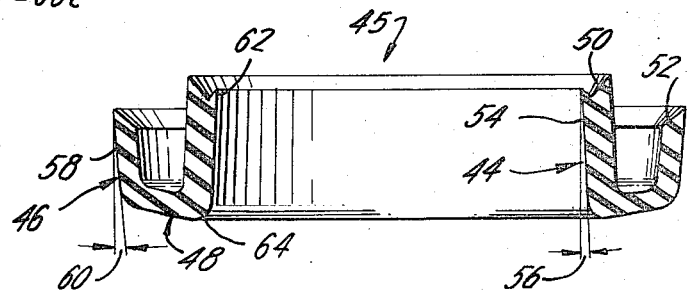

FIG. 4 shows a sealing ring 45 in its unstressed as-molded condition. Its cross-section includes an inner wall 44, an outer wall 46 and a connection wall 48, made of synthetic rubber or other suitable elastomer. Walls 44, 46 and 48 are individually and collectively imperforate. Inner wall 44 has a conical end surface 50 and outer wall 46 has a conical end surface 52. Surfaces 50 and 52 slant outward to their respective edges. The upper portion 54 of the inside surface of wall 44 (as will be seen) is to form a seal to a tube inserted into the coupling. The inner surface of wall 44 is somewhat smaller in diameter adjacent its free end than adjacent connecting wall 48, tapering by a small angle 56. The inside diameter of wall 44 and about half-way along its height (as viewed in FIG. 4) is made equal to the average or nominal outside diameter of the tube with which the coupling is to be used. The outer surface 58 of wall 46 is somewhat larger in diameter adjacent its free end than at connecting wall 48, and its taper is indicated by the angle 60. The free end of inner wall 44 includes a lip 62 whose thickness decreases progressively to a sharp edge at surface 54. The junction 64 between connecting wall 48 and inner wall 44 is at a transverse plane that is a little below the junction of walls 46 and 48, that is, more remote from the free ends of walls 44 and 46. This gives wall 48 a broad-angled conical lower surface.

Figure 5:
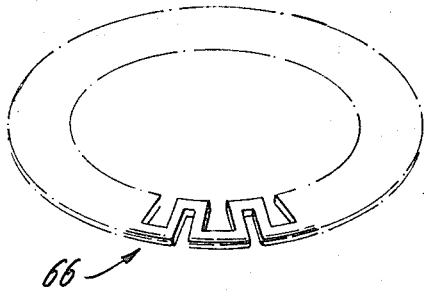
Figure 6:
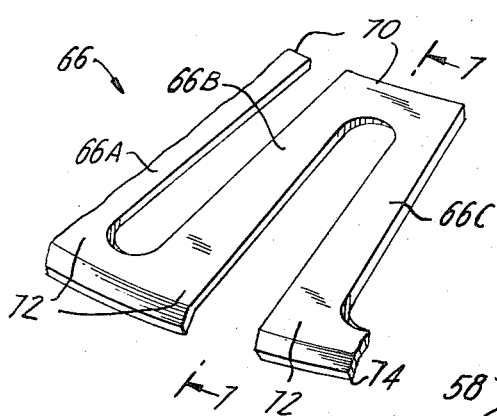

FIGS. 5 and 6 illustrate a ring 66 for gripping an inserted tube. Ring 66 includes many gripping elements 66A, 66B, 66C, etc. whose radially inner ends and interconnections 70 are disposed in a circle and whose radially outer ends and interconnections 72 are disposed in a circle. Elements 66A and 66B are interconnected only at their outer extremities, while elements 66B and 66C are interconnected only at their inner extremities. The interconnections 70 and 72 alternate at the inner and outer circles.

Figure 7:
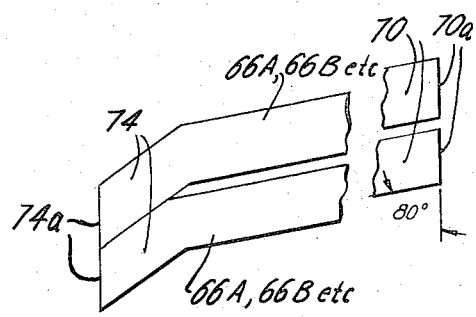

FIG. 7 shows radially inner and outer details of two stacked gripping rings 66, stressed as in FIG. 8. Ring 66 is stamped out of flat resilient sheet-metal, and is nominally flat in its unstressed condition. Peripheral offsets 74 are formed. Then, while the ring is stressed as in FIG. 8, it is sheared vertically at its inner and outer edges. The inner surfaces 70a form an angle in relation to the sheet-metal surface, of about 80°.

Ring 66 is to be received inside ferrule section 24. The outer diameter of ring 66 is slightly oversize compared to the inside diameter of section 24 so that, in the assembled coupling, the outer ends 72 of elements 66A, 66B, etc. are pressed against ferrule section 24. The wall of ferrule section 24 acts as a confining band. The breaks between outer ends and interconnections 72 allow the initially unconstrained outer diameter of the ring to be reduced a bit when the ring is pressed into the ferrule.

These off-sets separate the rings from each other when stacked. As described below in greater detail, these off-sets insure freedom of the elements of the several rings to assume slightly different slopes, thus acting separately in pairs in making locking contact with an inserted tube, despite slight irregularities of the surface of an inserted tube and despite slight misalignment of the tube axis relative to the coupling axis. End surfaces 70a and 74a tend to make full-face contact with a gripped tube and against the confining cylindrical surface of ferrule section 24.

FIG. 9 shows the parts of FIGS. 2-7 assembled to coupling body 14. While this body may be of metal, it may also be a molded part made of a transparent plastic. This is an advantage in enabling a visual check to be made of the relative positions of the ends of tubes A and B (FIG. 8) within body 14.

Body 14 has a flange or circular rib 76 whose outside diameter is preferably force-fitted into ferrule section 26, and the upper margin 26A of the ferrule is crimped or spun over rim 76 for uniting the assembled parts of the coupling. Ferrule 16 and body 14 represent containing means for sealing ring 45 and grip-rings 66.

Operating lever 18 of release member 34 is in its "release" position in FIG. 9, with detent 43 in aperture 30. Cam 36 of member 34 and cams 40 bear against the lower edges of helical slots 28 in ferrule 16 near the upper ends of those slots. Cam 36 and cams 40 (FIG. 3) hold member 34 in position closest to coupling body 14. The upper edge of cylindrical body 38 applies upward pressure to a stack of grip-rings 66 near the radially inner ends of their tube-gripping elements 66A, 66B, etc. Three rings 66 are illustrative. In another example, 10 rings are used. Rings 66 may be 0.005 inch half-hard stainless steel. Abutment rim 78 of body 14 restrains the radially outward end of elements 66A, 66B, etc. Consequently, those tube-gripping elements slope prominently when member 34 is in its "release" position. The outer periphery of each grip-ring 66 is biased against confining wall 24. Thus, the radius of the inner circle defined by the inner ends of the tube-gripping elements is enlarged (FIG. 9) compared with its radius when ring 66 is flat.

Release member 34, acting indirectly through stacked rings 66, applies a force to connecting wall 48 that is directed upward in body 14 and presses upper surface 50 of inner wall 44 against a conical surface 80 of an annular or circular rail or formation integral with body 14. Surface 80 slopes outward and upward as viewed in FIG. 9 or, stated differently, outward and away from ferrule opening 88 where a tube is to be inserted. Surface 80 constrains upper surface 50 of the sealing ring 45 in its enlarged condition as shown. Lip 62 and seal-forming surface 54 (FIG. 9A) are radially enlarged correspondingly. The upward force applied by release member 34 to rings 66 is also applied via rings 66 to connecting wall 48 of the sealing ring. Here, connecting wall 48 slopes inward and upward, i.e., inward and away from ferrule opening 88. This force also drives free edge 52 of outer wall 46 of the sealing ring against a shoulder 82 in body 14. The outer surface 58 of outer wall 46 bears against cylindrical sealing surface 84 in body 14. The diameter of sealing surface 84 is approximately equal to the minimum-diameter portion of tapered surface 58 (FIG. 4).

From the foregoing it is apparent that the release member 34, when in its "release" position, maintains the enlargement of the inner radii of grip-rings 66 and of the sealing surface 54 of sealing ring 45. The internal diameter of bore 86 in body 14 is slightly larger than the internal diameter or opening 88 of cylindrical section 20 of the ferrule. Thus, any tube that is of proper diameter to enter the coupling is small enough to be received in body member 14. Moreover, in the condition of the coupling in FIG. 9, the inner diameters of seal-forming surface 54 and of grip-rings 66 are slightly larger than bore 86. The enlarged diameter of seal-forming surface 54 causes that surface to be recessed relative to surface 86 and relative to the inward-bulging portion of sealing ring 45. In this way a tube being inserted, which might have burrs, is prevented from making damaging contact with seal-forming surface 54. The enlarged grip-rings cannot score the surface of a tube being inserted. This is important because the surface of tube B which is to be engaged by surface 54 should be smooth.

When the union of FIG. 1 is to be installed, the parts are adjusted to the configuration shown in FIG. 9. Tubes A and B may already be secured to other parts of an installed system of tubing, but they can be bent or flexed out of alignment with each other. The whole union can then be slid all the way onto tube B, for example. The tube enters one coupling 12 (FIG. 1) via its ferrule opening 88 and enters the other coupling 12 via bore 86. The tubes can then be realigned, and the union can finally be shifted so that the midpoint of body 14 is positioned over the aligned ends of tubes A and B. Levers 18 are then shifted to their "lock" positions so that each detent 43 enters its "lock" aperture 32. The parts are finally in the configuration shown in FIG. 8.

After tube B as been inserted, release member 34 is operated by lever 18 and shifts away from rings 66 (FIG. 8). The inner peripheries of rings 66 close on tube B. The slight clearance between the rings provided by offset rims 74 (FIG. 7) promotes independent action, allowing some space for pairs of elements 66B, 66C, etc. of each of the rings to assume various slopes as may be necessary to contact tube B effectively. In the form of grip-rings shown, there is no continuous circle of metal either at the inner diameter or at the outer diameter of a ring. This enables the grip-rings to be received snugly in ferrule section 24 which has high hoop strength. It also reduces the thrust necessary to operate the grip-rings into their "released" condition. Each element 66A, 66B, etc. confined at its outer end by the high hoop strength of ferrule section 24 acts as a basically straight miniature slender column when it engages an inserted tube. Its engagement is at an angle to the surface of tube B sufficiently close to perpendicularity (about 10° from normal) so that, even with a tube made of hard material, slipping is prevented. The greatest permissible departure from perpendicularity is limited by the coefficient of friction of the tube surface and related factors. Each pair of elements 66B, 66C, etc., acts separately for establishing the desired contact with an inserted tube. Consequently all such elements are effective individually in pairs and act collectively to resist blow-out of an inserted tube due to high internal fluid pressure and to resist mechanical pull-out of an inserted tube, despite minor eccentricities or slight tilt of the tube in the coupling, and despite other irregularities of the tube and the coupling parts.

Release of rings 66 from their flexed condition in FIG. 9 also releases the lifting pressure of the top ring 66 against sealing ring 45. This allows surface 54 to form a seal about tube B. Several factors promote such action. First, the minimum diameter of tapered surface 54 adjacent end 50 (FIG. 4) is less than the diameter of tube B with which the coupling is to be used, so that the sealing ring contracts resiliently against the tube when lifting pressure of ring 66 is relaxed. Further, now-released end surface 50 of the sealing ring, in contracting radially from its stretched condition of FIG. 9, is forced to travel down conical surface 80 of body 14. The contracting force of surface 50 promotes release and separation of this surface from surface 80. Additionally, there are several notches 89 (FIG. 9) cut in cam surface 80, allowing internal fluid pressure to enter the space between the inner and outer walls of the sealing ring. This pressure drives those walls against tube B and against bore 84, respectively. The seal of inner wall 44 against tube B is enhanced by the thin lip 62 (FIG. 4) being pressed against tube B both by virtue of its resilient contraction following release of surface 50 from camming surface 80 and as a result of fluid pressure acting on the lip. Finally, connecting wall 48 changes from its prominent conical slope in FIG. 9 to reduced slope or no slope at all in FIG. 8, drawing wall 44 including seal-forming surface 54 against tube B.

In the "locked" condition of the coupling in FIG. 8, internal fluid pressure also presses the sealing ring against the uppermost grip-ring 66. This adds to the self-bias of that ring which therefore bears more firmly against tube B.

It is thus seen that to assemble the coupling 12 to a tube, or to connect two tubes by a union as in FIG. 1, involves only the steps of sliding the coupling into place as described above and shifting release lever 18 to its locking position. Sealing ring 45 and locking rings 66 are self-energized into firm cooperation with the inserted tube. The time and labor entailed are minimal, so that the described coupling is very economical to use.

The coupling can also be released quickly and without special tools, merely by moving lever 18 to its "release" position. Operation of lever 18 between its "lock" position and its "release" position operates member 34 through a small angle about the common axis of bore 86, opening 88, sealing ring 45 and the grip-rings 66. This arcuate motion in the "release" direction drives cylinder 38 against rings 66, forcing the rings to release their locking grip on tube B. Cylindrical body 38, acting through rings 66, applies force to the lower wall 48 of the sealing ring, to drive seal-forming surface 54 (FIG. 4) back into its radially enlarged condition as shown in FIG. 9. Inner wall 44 of the sealing ring is forced in the axial direction deeper into body 14, driving surface 50 of wall 44 against outward-sloping cam surface 80 of body 14. The proportions of surface 50 and cam surface 80 are such that surface 50 is stretched in going from its position in FIG. 8 to that in FIG. 9. This enlarges the adjacent seal-forming surface 54 radially, lifting it away from tube B.

Forcing inner wall 44 of the sealing ring to slide along tube B tends to break any adhesion that might develop between wall 44 and tube B. The cooperation of surfaces 50 and 80 in enlarging surface 54 also helps in breaking adhesion that might develop between tube B and seal-forming surface 54.

Operation of the release member 34 to release an inserted tube imposes releasing force on all the grip-rings and on sealing ring 45 parallel to the axis of the coupling. This causes enlargement of the inner diameters of the grip-rings and of the seal-forming surface 54, notably without rubbing against or even touching the seal-forming surface 54 and thus avoiding a possible source of damage to that critically important surface.

FIG. 10 shows the coupling of FIGS. 8 and 9 with lever 18 in its "lock" position (as in FIG. 8) but with no tube B in position to restrain the grip-rings and the sealing ring. As shown, grip-rings 66 assume their inherently flat shape, spaced apart by their rims 74 (FIG. 7). Sealing ring 45, its outside diameter constrained by body 14, is somewhat distorted as compared with its unstressed condition as shown in FIG. 4. The minimum inside diameter of seal-forming surface 54 is perhaps slightly smaller than in FIG. 4.

To change from the configuration of FIG. 10 to that of FIG. 9 for admitting a tube B, release member 34 is operated to its "release" position. The actions that occur here are essentially the same as is described above in connection with releasing a tube B from its gripped and sealed condition shown in FIG. 8. As an exception, the minimum diameter of upper lip 62 in FIG. 10 is less than in FIG. 8. Note dimension c in FIG. 10A. The outer edge of surface 50 in its condition shown in FIG. 10 is safely larger by dimension a (FIG. 10A) than the minimum diameter of conical surface 80 of body 14. Considering each elemental segment of the sealing ring around its circumference, increasing the tilt of each element 66A, 66B, etc. of the uppermost grip-ring causes pressure against the junction 64 of walls 44 and 48 of the sealing ring. This imposes an outward-tilting torque on the cross-section of each elemental segment of sealing-ring walls 44 and 48, tending to enlarge the diameter of seal-forming surface 54. Lifting of inner wall 44 also brings surface 50 into sliding contact with conical surface 80. The latter acts as a cam is stretching the upper end of wall 44, stretching lip 62 and enlarging its radius by the dimension b. In this operation, surface 54 reaches the sheltered position of FIG. 9A, protected by the smaller diameters of bore 86 and of the lower part of the sealing ring near and at connecting wall 48. Lifting of the radially inner portions of rings 66 by release member 34 raises outer wall 46 of the sealing ring 45 against shoulder 82.

The ferrule opening 88 provides a gage for limiting the diameter of the tubes to be inserted. In the "released" condition of the fitting, all the grip-rings have a larger inner diameter than opening 88, and all of the parts are coaxial. Thus, a tube slightly smaller than opening 88 enters the fitting and is guided by ferrule section 20 so as to pass through grip-rings 66 without damage to the tube surface. The tube also passes through sealing ring 45 without danger of the tube damaging the seal-forming surface 54. The tube enters bore 86 in body 14 which thereafter complements ferrule section 20 in restraining the tube against tilting, thus complementing ferrule opening 88 and the grip-rings tending to hold the tube centered and coaxial in the coupling. The relative diameters of the parts as just described also enable a tube to pass safely into coupling 12 in either direction, as described above.

On occasion, as where a fitting is in an inaccessible position, a special tool (not shown) can be used for manipulating lever 18. A number of openings 90 are then useful for admitting an anchoring element of such a tool. Ring 92 acts as a spacer between the bottom of ferrule section 24 and the lowermost grip ring 66, assuring space for admitting such anchoring elements of a manipulating tool.

The described tube fitting offers substantial benefits to manufacturers, and to both installers and maintainers of equipment that uses such fittings. The parts are adapted to low-cost mass-production manufacture and assembly. The fittings are readily used since tubes to be inserted into the fittings need only to be cut to length and (in some cases) roughly deburred, and the fittings are merely slipped into position on a tube and then instantly locked without resort to special tools. In case repairs become necessary, the fitting is instantly and positively releasable by operating the self-contained release member, requiring no special tools. Important savings in labor and in labor costs are gained through use of the novel fittings. The fittings can be used with tubes of various materials, they can be installed and released by near-amateurs, and they can be made in various forms such as unions, elbows T's, Y's, X's, reduction couplings, and for joining tubing to a tank or other device.

Various features of the invention are integrated in the illustrative coupling. It will be apparent that certain of the novel features may be used without others, and variations will occur to those skilled in the art. Consequently, the invention should be broadly construed, in accordance with its full spirt and scope.

What is claimed is:

1. A releasable fitting for forming a seal to an inserted tube, including containing means having an opening for admitting a tube and limiting the maximum diameter of a tube that may be inserted, an elastomeric sealing ring in said containing means, said sealing ring and said opening being disposed about a common axis at spaced-apart positions along the axis, said sealing ring having a surface smaller in diameter than said maximum diameter for forming a seal to an inserted tube, and release means in said containing means for causing a force to be applied to an annular portion of said sealing ring close to but free of contact with said seal-forming surface for enlarging the diameter of the seal-forming surface greater than said maximum diameter, whereby a tube may be inserted and removed from the fitting when the seal-forming surface is enlarged as aforesaid without rubbing and possibly damaging the seal-forming surface.

2. A releasable fitting in accordance with claim 1, wherein said sealing ring has coaxial inner and outer walls movable in relation to each other and a further wall connecting said inner and outer walls, an edge portion of said inner wall spaced axially from the connecting wall providing said seal-forming surface, and wherin said release means is arranged for causing said inner wall to shift axially relative to the outer wall so as to impose a diameter-enlarging stress on said edge portion of the inner wall.

3. A releasable fitting in accordance with claim 2, wherein said containing means includes a shoulder for arresting said outer wall during shifting of said inner wall.

4. A fitting in accordance with claim 3, wherein said release means further includes means providing an annular stationary camming surface coaxial with said sealing ring and cooperable with said edge portion of said inner wall to enlarge the diameter of said edge portion and thus to enlarge said seal-forming surface when said inner wall is shifted as aforesaid.

5. A fitting in accordance with claim 1, wherein said release means includes an annular cam for acting radially outward on a tube-encircling portion of said sealing ring adjacent the seal-forming surface thereof when force of the release means is applied.

6. A fitting in accordance with claim 1, wherein said release means includes an annular cam coaxial with said sealing ring, said sealing ring having an edge portion circumferentially grooved to form tube-encircling inner and outer lips, the inner lip tapering to an edge demarking an edge of said seal-forming surface and the outer lip being cooperable with said annular cam to be circumferentially stretched thereby for consequently enlarging the diameter of said inner lip and said seal-forming surface when the force of said release means is applied.

7. A releasable fitting in accordance with claim 6, wherein said annular cam is stationary, and wherein said sealing ring has concentric inner and outer walls, and a wall connecting said inner and outer walls, said inner wall bearing said circumferentially grooved edge portion, and wherein said release means includes an annular member for shifting said outer wall to enforce cooperation of said outer lip with said annular cam.

8. A releasable fitting in accordance with claim 1, wherein said sealing ring is of generally U-shaped cross-section including inner, outer and connecting walls, said inner and outer walls having free edge portions remote from the connecting wall, said containing means having a portion for forming a seal to said outer wall and providing a shoulder for arresting said free edge portion of said outer wall in one axial direction, said release means including a release member for imposing an axial shifting force on said inner wall remote from the free edge portion thereof, said release member being operable along and arcuately about the axis of the sealing ring, said containing means and said release member having cooperating cam means for developing said axial shifting force when said release member is operated arcuately.

9. A releasable fitting in accordance with claim 8, wherein said free edge portion of said inner wall is adjacent to said seal-forming surface and wherein said release means includes an annular cam fixed to said containing means and coaxial with said sealing ring and cooperable with said free edge portion of said inner wall when the latter is shifted by said release member in said one axial direction, the cooperation of said cam and said free edge portion of the inner wall being effective to enlarge the diameter of said free edge portion of the inner wall, for thereby enlarging the seal-forming surface radially.

10. A releasable fitting in accordance with claim 1, wherein said sealing ring is of generally "U" shaped cross-section and includes inner and outer walls and a wall connecting said inner and outer walls, said release means including a circular rail integral with said containing means for providing a camming surface coaxial with the sealing ring, arranged for outward-acting cooperation with a free edge portion of said inner wall remote from said connecting wall and adjacent to said seal-forming surface, said release means including an annular axially movable member arranged to shift said inner wall for enforcing cooperation of said free edge portion of said inner wall with said camming surface, for thereby causing the camming surface to stretch said free edge portion of said inner wall and thereby increase the diameter of said seal-forming surface.

11. A releasable fitting in accordance with claim 1, including means in said containing means biased for mechanically gripping an inserted tube, said release means when operated to enlarge the diameter of said seal-forming surface also cooperating with the mechanical gripping means to release a tube gripped thereby.

12. A releasable fitting in accordance with claim 1, including means for gripping an inserted tube, said means comprising a series of tube-gripping elements each having inner and outer extremities, said inner extremities defining a tube-admitting aperture, said fitting including means confining said outer extremities of said elements against outward displacement, said elements sloping toward said axis and away from said tube-receiving opening, said release means being operative to increase the slope of said elements and to increase the diameter of said tube-admitting aperture when acting to enlarge the seal-forming surface.

13. A releasable fitting in accordance with claim 12, wherein said release means includes an annular axially movable release member cooperating with said containing means and arranged to develop said slope-increasing force against said tube-gripping elements, said tube-gripping elements being interposed between said sealing ring and said release member, said elements transmitting releasing force from said release member of said sealing ring, for concurrently enlarging both the inner circle of the gripping elements and the radius of said sealing surface.

14. A releasable fitting in accordance with claim 11, wherein said means for gripping an inserted tube includes at least one grip-ring coaxial with the sealing ring, comprising numerous elements having respective extremities in inner and outer circles, said elements sloping toward the axis of the sealing ring and away from said tube-admitting opening, said elements having interconnections arranged in inner and outer circles divided by alternating discontinuities to promote independent cooperation of pairs of said elements with an inserted tube, said containing means forming a constraining hoop about the outer extremities of said elements.

15. A releasable fitting in accordance with claim 14, wherein said gripping means includes plural grip-rings as aforesaid arranged in a coaxial stack, said rings having off-sets at the outer peripheries thereof for providing a limited space between the inner-circle extremities of successive rings to enable the elements of the stacked rings to act independently in pairs for gripping an inserted tube despite geometric irregularities of an inserted tube in relation to the inner circles of the grip-rings.

16. A releasable fitting in accordance with claim 10, further including means for gripping an inserted tube comprising plural grip-rings stacked coaxially along the axis of said sealing ring, each said grip-ring comprising numerous elements having respective extremities in inner and outer circles, said elements sloping toward the axis of the sealing ring and away from said tube-admitting opening, said elements having interconnections arranged in inner and outer circles divided by alternating discontinuities to promote independent cooperation of pairs of said elements with an inserted tube, said containing means forming a constraining hoop about the outer extremities of said elements, means at the outer peripheries of said rings for spacing the inner extremities of the stacked grip-rings from each other, the inner extremities of said stack of grip-rings being interposed axially between said annular axially movable member of said release means and said inner wall of said sealing ring, said grip-rings transmitting the shifting force from said annular member to said sealing ring and the slope of said elements being concurrently increased to enlarge the inner circles of their interconnections for enlarging the grip-ring apertures to admit and to release a tube.

17. A coupling for releasably gripping an inserted cylindrical part such as a tube or a rod, including a containing member having an internally cylindrical surface, at least one grip ring of sheet-metal including elements having inner and outer extremities in inner and outer circles, respectively, pairs of said elements having inner interconnections at the inner circle and pairs of said elements having outer interconnections at the outer circle so that the grip-ring including said elements and their interconnections form an annular sinuous shape wherein successive inner interconnections are separated from each other and successive outer interconnections are separated from each other, interconnected pairs of said outer extremities bearing against said cylindrical surface, a circular rim restricting shift in one axial direction of said outer extremities, and an annular release member operable axially against said elements adjacent their inner extremities for flexing said ring and thereby increasing the diameter of said inner circle in order to release or admit a cylindrical part, said coupling having means defining an opening at which a cylindrical part is admitted, said elements slanting radially inward and away from said opening, the slant being greater when the ring is flexed by said release member and the slant being reduced when the ring grips an inserted cylindrical part, said ring being self-biased to reduce the slant of the elements thereof for thereby reducing the diameter of said inner circle to grip an inserted cylindrical part when released by said release member.

18. A coupling in accordance with claim 17, including plural grip-rings as aforesaid, stacked coaxially and having the outer extremities of the elements thereof confined by said rim against shift in said one direction and operable by said release member to increase said slope of said elements thereof for flexing said grip-rings to release or to receive a cylindrical part.

19. A coupling in accordance with claim 18, wherein said rings include peripheral offsets for spacing said inner extremities of said rings from each other to accommodate separate cooperation of interconnected pairs of said elements with an inserted cylindrical part.

20. A coupling in accordance with claim 17, wherein said annular release member is rotatable about its axis within said containing member and wherein said release member and said containing member have cooperating cam means for forcing said release member when rotated in one direction to flex said grip-ring and to release the grip-ring when rotated in the opposite direction.

21. A coupling in accordance with claim 17, wherein said inner extremities of said elements have faces disposed at an angle slightly less than 90° relative to one surface of the sheet-metal grip-ring for maximum area of engagement of said faces with an inserted cylindrical part whose diameter limits said inner circle so that the slant of said elements is the complement of said angle.

* * * * *